United States Patent
Nishimura et al.

(10) Patent No.: US 12,454,593 B2
(45) Date of Patent: *Oct. 28, 2025

(54) COMPOSITION FOR SELF-ADHESIVE FOAMED SHEET AND SELF-ADHESIVE FOAMED LAMINATE SHEET

(71) Applicant: ZEON CORPORATION, Tokyo (JP)

(72) Inventors: Shunsuke Nishimura, Tokyo (JP); Shinsuke Ashida, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 105 days.

This patent is subject to a terminal disclaimer.

(21) Appl. No.: 17/759,756

(22) PCT Filed: Feb. 15, 2021

(86) PCT No.: PCT/JP2021/005572
§ 371 (c)(1),
(2) Date: Jul. 29, 2022

(87) PCT Pub. No.: WO2021/166861
PCT Pub. Date: Aug. 26, 2021

(65) Prior Publication Data
US 2023/0078720 A1    Mar. 16, 2023

(30) Foreign Application Priority Data
Feb. 19, 2020  (JP) ................... 2020-026398

(51) Int. Cl.
*C08F 283/06* (2006.01)
*C08J 9/00* (2006.01)

(52) U.S. Cl.
CPC ........... *C08F 283/06* (2013.01); *C08J 9/0061* (2013.01); *C08J 2333/08* (2013.01); *C08J 2491/06* (2013.01)

(58) Field of Classification Search
CPC .............. C08F 212/08; C08F 220/06; C08F 220/1802; C08F 220/1804; C08F 220/1808; C08F 220/44; C08F 283/06; C08J 2201/026; C08J 2333/08; C08J 2333/20; C08J 2491/06; C08J 9/0023; C08J 9/0061; C08J 9/30
See application file for complete search history.

(56) References Cited

U.S. PATENT DOCUMENTS

| | | | | |
|---|---|---|---|---|
| 5,939,479 | A * | 8/1999 | Reaves | C09J 133/08 524/475 |
| 6,586,510 | B1 * | 7/2003 | Brown | C09J 7/385 428/354 |
| 2012/0308815 | A1 * | 12/2012 | Buzoujima | C09J 9/02 428/340 |
| 2018/0056625 | A1 | 3/2018 | Ashida et al. | |
| 2018/0215954 | A1 * | 8/2018 | Miyazaki | C08F 290/048 |
| 2019/0185720 | A1 * | 6/2019 | Ashida | B32B 27/286 |
| 2019/0367780 | A1 | 12/2019 | Tanaka et al. | |
| 2023/0090231 | A1 * | 3/2023 | Nishimura | C09J 7/385 428/317.3 |

FOREIGN PATENT DOCUMENTS

| | | | | |
|---|---|---|---|---|
| JP | H05311024 A | | 11/1993 | |
| JP | H0616954 A | | 1/1994 | |
| JP | H0641499 A | * | 2/1994 | |
| JP | H0892534 A | * | 4/1996 | |
| JP | 2003251768 A | | 9/2003 | |
| JP | 2006176693 A | | 7/2006 | |
| WO | 2016147679 A1 | | 9/2016 | |
| WO | WO-2018051984 A1 | * | 3/2018 | ............. B32B 27/00 |
| WO | 2018151274 A1 | | 8/2018 | |

OTHER PUBLICATIONS

Translation of JP H0641499A (including Abstract translation), Yonekawa et al., Feb. 15, 1994. (Year: 1994).*
Translation of JP-H0892534, Ilda Toshizo, Apr. 9, 1996. (Year: 1996).*
Aug. 23, 2022, International Preliminary Report on Patentability issued in the International Patent Application No. PCT/JP2021/005572.
May 11, 2021, International Search Report issued in the International Patent Application No. PCT/JP2021/005572.
Feb. 20, 2024, the Extended European Search Report issued by the European Patent Office in the corresponding European Patent Application No. 21756216.4.

* cited by examiner

*Primary Examiner* — Hai Vo
(74) *Attorney, Agent, or Firm* — KENJA IP LAW PC

(57) ABSTRACT

The present disclosure is directed to providing a self-adhesive foamed laminate sheet which is excellent in air escapability even after exposure to heat and pressure, and a composition for a self-adhesive foamed sheet which can be used to produce such a self-adhesive foamed laminate sheet. The composition for a self-adhesive foamed sheet of the present disclosure includes a polymer, a crosslinking agent, and a wax agent.

4 Claims, 2 Drawing Sheets

COMPOSITION FOR SELF-ADHESIVE FOAMED SHEET AND SELF-ADHESIVE FOAMED LAMINATE SHEET

TECHNICAL FIELD

The present disclosure relates to a composition for a self-adhesive foamed sheet and a self-adhesive foamed laminate sheet.

BACKGROUND

In recent years, an adhesive sheet composed of a sheet-like member made of a foamed material having a large number of fine pores and having a self-adhesive property, in other words, a self-adhesive foamed sheet (hereinafter, sometimes simply referred to as "foamed sheet") has been used. Upon usage, such a sheet is made to be adhered to a smooth adherend such as window glass. The adhesion of a self-adhesive foamed sheet is achieved not by a glue but by adsorption to an adherend by means of fine pores. Accordingly, a self-adhesive foamed sheet is easily reattached as compared with a conventional adhesive sheet employing glue adhesion, and is suitably used for applications such as wallpaper, posters, and stickers, for example. When used in these applications, a self-adhesive foamed sheet is usually used in the form of a self-adhesive foamed laminate sheet (hereinafter, sometimes abbreviated as "laminate sheet") laminated to a substrate. Such a self-adhesive foamed laminate sheet provided with decoration such as printing on the substrate side surface can be advantageously used for the above-described applications.

Conventionally, for enhancing the performances of a self-adhesive foamed laminate sheet, efforts to improve a composition used for preparing a foamed sheet composing a laminate sheet (hereinafter, referred to as "composition for a self-adhesive foamed sheet", and sometimes simply referred to as "composition for a foamed sheet").

For example, PTL 1 proposes a composition for a foamed sheet including a polymer having certain properties and a crosslinking agent. A laminate sheet including a foamed sheet formed from the composition for a foamed sheet of PTL 1 can prevent the resin from remaining on glass as an adherend even after the sheet has been exposed to weather.

Citation List

Patent Literature

WO 2018/151274 A

SUMMARY

Technical Problem

Laminate sheets need to have a property for promoting escape of air bubbles remaining between a sheet and an adherend when the foamed sheet side is made to be attached to the adherend by means of adsorption (in other words, they need to have an excellent air escapability). In particular, because there are cases where laminate sheets are exposed to a high temperature and pressurized environment, e.g., during transportation, the laminate sheets need to maintain an excellent air escapability even after exposure to heat and pressure (i.e., need to have an excellent air escapability even after exposure to heat and pressure). The present inventors have conducted researches and have found that there is still room for improvement in air escapability of the aforementioned conventional composition for a foamed sheet after the foamed sheet has been exposed to heat and/or pressure.

Accordingly, it would be helpful to provide a self-adhesive foamed laminate sheet which is excellent in air escapability even after exposure to heat and pressure, and a composition for a self-adhesive foamed sheet which can be used to produce such a self-adhesive foamed laminate sheet.

Solution to Problem

The present inventors conducted extensive studies to solve the aforementioned problem. The present inventors have found that, when a foamed sheet is formed from a composition for a foamed sheet including a polymer, a crosslinking agent, and a wax agent, an excellent air escapability can be imparted to a laminate sheet having that foamed sheet even after exposure to heat and pressure, thereby completing the present disclosure.

In other words, the present disclosure is directed to advantageously solving the above problem, and a composition for a self-adhesive foamed sheet of the present disclosure comprises: a polymer; a crosslinking agent; and a wax agent. When a composition for a foamed sheet including a polymer, a crosslinking agent, and a wax agent is used to form a foamed sheet as set forth above, an excellent air escapability can be imparted to a laminate sheet provided with a foamed sheet even after exposure to heat and pressure.

Here, in the composition for a self-adhesive foamed sheet of the present disclosure, the polymer preferably comprises 60 mass % or more and 99 mass % or less of a (meth) acrylate monomer unit. When a composition for a foamed sheet containing a polymer including a (meth)acrylate monomer unit in the above ratio is used, a laminate sheet which can prevent the resin from remaining on an adherend while retaining a good self-adhesion force (adhesion force to the adherend) can be obtained.

In this disclosure, when a polymer is described as "including a monomer unit", this means that "a polymer obtained with the monomer includes a repeating unit derived from the monomer". Further, in this disclosure, "(meth)acrylate" is used to indicate "acrylate" and/or "methacrylate".

Further, in the composition for a self-adhesive foamed sheet of the present disclosure, the polymer preferably comprises 0.1 mass % or more and 10 mass % or less of an unsaturated carboxylic acid monomer unit. When a composition for a foamed sheet containing a polymer including an unsaturated carboxylic acid monomer unit in the above-described ratio is used, a sufficient strength can be imparted to a foamed sheet. In addition, a laminate sheet which can prevent the resin from remaining on an adherend while maintaining a good self-adhesive force can be obtained.

Moreover, in the composition for a self-adhesive foamed sheet of the present disclosure, the polymer is preferably free of N-methylol groups. When a composition for a foamed sheet containing a polymer free of N-methylol groups is used, generation of formaldehyde can be reduced to a sufficient low level during foaming and curing of the composition for a foamed sheet.

Here, in the composition for a self-adhesive foamed sheet of the present disclosure, the wax agent preferably comprises a fatty acid ester having a fatty acid moiety with a carbon number of 16 or more and 34 or less. When a fatty acid ester having a fatty acid moiety (a structure derived from a fatty acid in a fatty acid ester) having a carbon number within the above-described range is used as the wax agent, the air escapability even after exposure to heat and pressure of a laminate sheet can be further improved.

Further, in the composition for a self-adhesive foamed sheet of the present disclosure, a blending amount of the fatty acid ester is preferably 0.5 parts by mass or more and 10 parts by mass or less per 100 parts by mass of the polymer. When a composition for a foamed sheet in which the amount of a certain fatty acid ester per 100 parts by mass of the polymer is within the above-described range is used, the air escapability even after exposure to heat and pressure of the laminate sheet can be further enhanced.

In addition, in the composition for a self-adhesive foamed sheet of the present disclosure, the fatty acid ester preferably comprises an alcohol moiety with a carbon number of 30 or more and 34 or less. When a fatty acid ester having an alcohol moiety (a structure derived from an alcohol in a fatty acid ester) with a carbon number within the above-described range is used as the wax agent, the air escapability even after exposure to heat and pressure of the laminate sheet can be further enhanced.

The present disclosure is directed to advantageously solving the above problem, and a self-adhesive foamed laminate sheet of the present disclosure is a self-adhesive foamed laminate sheet comprising: a substrate; and a self-adhesive foamed sheet formed from any one of compositions for a self-adhesive foamed sheet described above, the substrate being a paper substrate other than synthetic paper substrates, a plastic substrate, a fiber substrate, a metal substrate, or a glass substrate. A laminate sheet including a foamed sheet formed from the composition for a foamed sheet described above on a paper substrate other than synthetic paper substrates, a plastic substrate, a fibrous substrate, a metal substrates, or a glass substrate as set forth above is superior in the air escapability even after exposure to heat and pressure.

Note that, in the present disclosure, "synthetic paper" refers to a film made of a resin composition containing a thermoplastic resin and a filler.

Advantageous Effect

According to the present disclosure, a self-adhesive foamed laminate sheet which is excellent in air escapability even after exposure to heat and pressure, and a composition for a self-adhesive foamed sheet which can be used to produce such a self-adhesive foamed laminate sheet can be provided.

DETAILED DESCRIPTION

Figure 1:
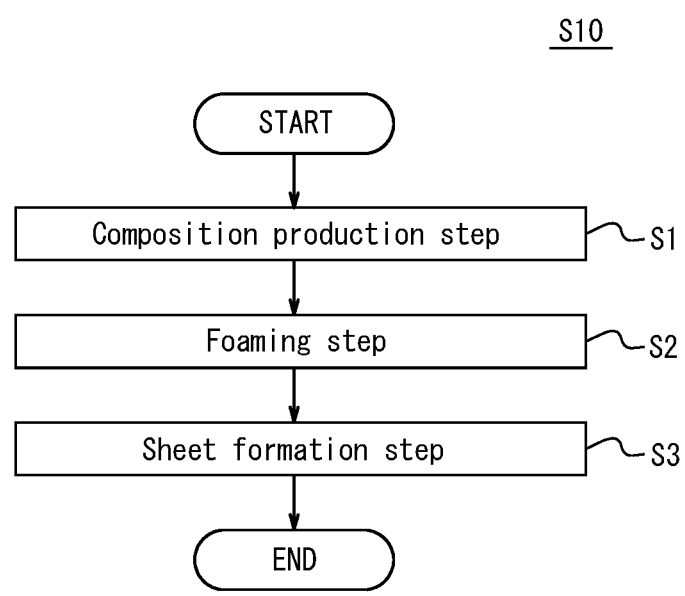
FIG. 1 is a flowchart illustrating an example of a method of producing a self-adhesive foamed laminate sheet according to the present disclosure.

An embodiment of the present disclosure will be described below.

Here, a composition for a self-adhesive foamed sheet of the present disclosure can be suitably used in production of a self-adhesive foamed sheet which is a component of a self-adhesive foamed laminate sheet of the present disclosure. Further, the self-adhesive foamed laminate sheet of the present disclosure includes a self-adhesive foamed sheet formed from the composition for a self-adhesive foamed sheet of the present disclosure.

(Composition for Self-adhesive Foamed Sheet)

A composition for a foamed sheet of the present disclosure includes a polymer, a crosslinking agent, and a wax agent, and may optionally further contain a solvent and other additives.

The composition for a foamed sheet of the present disclosure can be used to form a laminate sheet on a paper substrate other than synthetic paper substrates, a plastic substrate, a fibrous substrate, a metal substrates, or a glass substrate to thereby produce a laminate sheet having an excellent air escapability even after exposure to heat and pressure.

<Polymer>

The polymer used in the composition for a foamed sheet of the present disclosure forms a resin matrix in a foamed sheet produced through foaming and crosslinking of the composition for a foamed sheet.

Here, the polymer is not particularly limited, but may include, for example, at least one monomer unit selected from the group consisting of a (meth)acrylate monomer unit, an unsaturated carboxylic acid monomer unit, a vinyl cyanide monomer unit, and an alkenyl aromatic monomer unit. Furthermore, the polymer may include a monomer unit other than a (meth)acrylate monomer unit, an unsaturated carboxylic acid monomer unit, a vinyl cyanide monomer unit, or an alkenyl aromatic monomer unit (hereinafter, referred to as "other monomer units").

<<(Meth)acrylonitrile Monomer Unit>>

The (meth)acrylate monomer unit is a repeating unit derived from a (meth)acrylate monomer. When the polymer contains a (meth)acrylate monomer unit, flexibility is imparted to a foamed sheet to be produced and a laminate sheet having good self-adhesive force can be produced.

Examples of the (meth)acrylate monomers include, but are not particularly limited to, alkyl (meth)acrylic acid ester monomers such as methyl (meth)acrylate, ethyl (meth)acrylate, n-propyl (meth)acrylate, n-butyl (meth)acrylate, sec-butyl (meth)acrylate, n-heptyl (meth)acrylate, n-hexyl (meth)acrylate, n-octyl (meth)acrylate, 2-ethylhexyl (meth)acrylate, and n-dodecyl (meth)acrylate; and alkoxyalkyl (meth)acrylic acid ester monomers such as 2-methoxyethyl (meth)acrylate, 3-methoxypropyl (meth)acrylate, 3-methoxybutyl (meth)acrylate, and ethoxymethyl (meth)acrylate.

One kind of (meth)acrylate monomer may be used alone, or two or more kinds of (meth)acrylate monomers may be used in combination. Note that in this disclosure, "(meth)acryl" is used to indicate "acryl" and/or "methacryl".

Here, from the viewpoint of further increasing the flexibility of the foamed sheet and further ensuring a better self-adhesion force of the laminate sheet, the (meth)acrylate monomer is preferably an alkyl (meth)acrylic acid ester monomer, more preferably an alkyl (meth)acrylic acid ester monomer with a carbon number of 1 or more and 14 or less in an alkyl group (which is bonded to the non-carbonylic oxygen atom) (hereinafter, sometimes simply referred to as "C1-14 alkyl (meth)acrylic acid ester monomer").

Examples of the C1-14 alkyl (meth)acrylic acid ester monomer include methyl acrylate, ethyl acrylate, n-propyl acrylate, n-butyl acrylate, sec-butyl acrylate, n-heptyl acrylate, n-hexyl acrylate, n-octyl acrylate, 2-ethylhexyl acrylate, methyl methacrylate, ethyl methacrylate, n-propyl methacrylate, n-butyl methacrylate, n-octyl methacrylate, and n-dodecyl methacrylate, for example. Of these, n-butyl acrylate, ethyl acrylate, and 2-ethylhexyl acrylate are preferred from the viewpoint of the self-adhesion force and the cost.

The ratio of the (meth)acrylate monomer unit in the polymer when all repeating units in the polymer (all monomer units) are taken to be 100 mass % is preferably 60 mass % or more, more preferably 70 mass % or more, even more preferably 80 mass % or more, and particularly preferably 85 mass % or more, and is preferably 99 mass % or less, more preferably 95 mass % or less, and even more preferably 92 mass % or less. When the ratio of the (meth)acrylate monomer unit in the polymer is 60 mass % or more, sufficient self-adhesion force of the laminate sheet can be ensured. On the other hand, when the ratio of the (meth) acrylate monomer unit in the polymer is 99 mass % or less, the self-adhesion force of the laminate sheet is prevented from increasing excessively. This prevents the resin of the laminate sheet from remaining on an adherend.

<<Unsaturated Carboxylic Acid Monomer Unit>>

An unsaturated carboxylic acid monomer unit is a repeating unit derived from an unsaturated carboxylic acid monomer.

Specific examples of the unsaturated carboxylic acid monomer $\alpha,\beta$-ethylenically unsaturated monocarboxylic acids such as acrylic acid, methacrylic acid, and crotonic acid; $\alpha,\beta$-ethylenically unsaturated polyvalent carboxylic acids such as itaconic acid, maleic acid, and fumaric acid; and $\alpha,\beta$-ethylenically unsaturated polyvalent carboxylic acid partial esters such as monomethyl itaconate, monobutyl maleate, and monopropyl fumarate. Monomers including a group from which a carboxylic acid group can be derived by hydrolysis etc., such as maleic anhydride, and itaconic anhydride, can be used as well. Of these, itaconic acid, acrylic acid, and methacrylic acid are preferred from the viewpoint of reactivity with the crosslinking agent to be described later, the stability of a polymer latex, and the cost, and acrylic acid is more preferred.

One kind of unsaturated carboxylic acid monomer may be used alone, or two or more kinds of unsaturated carboxylic acid monomers may be used in combination.

The ratio of the unsaturated carboxylic acid monomer unit in the polymer when all repeating units in the polymer (all monomer units) are taken to be 100 mass % is preferably 0.1 mass % or more, more preferably 0.5 mass % or more, even more preferably 1 mass % or more, and is preferably 10 mass % or less, more preferably 5 mass % or less, and even more preferably 2.5 mass % or less. When the ratio of the unsaturated carboxylic acid monomer unit in the polymer is 0.1 mass % or more, a crosslinking reaction by the crosslinking agent to be described later can be sufficiently proceeded. As a result, the resin of the laminate sheet is prevented from remaining on an adherend, and a sufficient strength is imparted to the obtained foamed sheet at the same time. On the other hand, when the ratio of the unsaturated carboxylic acid monomer unit in the polymer is 10 mass % or less, control on the viscosity of the polymerization system during polymerization so as to fall within an appropriate range can be made easier and excessive crosslinking of the polymer and resulting reduction in the self-adhesive force of a laminate sheet are prevented.

<<Vinyl Cyanide Monomer Unit>>

A vinyl cyanide monomer unit is a repeating unit derived from a vinyl cyanide monomer. Specific examples of the vinyl cyanide monomer include $\alpha,\beta$-ethylenically unsaturated nitrile monomers. No specific limitations are placed on $\alpha,\beta$-ethylenically unsaturated nitrile monomers that can be used other than being an $\alpha,\beta$-ethylenically unsaturated compound containing a nitrile group. Examples include acrylonitrile; $\alpha$-halogenoacrylonitriles such as $\alpha$-chloroacrylonitrile and $\alpha$-bromoacrylonitrile; and $\alpha$-alkylacrylonitriles such as methacrylonitrile and $\alpha$-ethylacrylonitrile. Of these, acrylonitrile is preferred from the viewpoint of improving the cohesive force of the composition for a foamed sheet and increasing the breaking strength of a foamed sheet.

One vinyl cyanide monomer may be used alone, or two or more vinyl cyanide monomers may be used in combination.

The ratio of the vinyl cyanide monomer unit in the polymer when all repeating units in the polymer (all monomer units) are taken to be 100 mass % is preferably 1 mass % or more, more preferably 3 mass % or more, even more preferably 5 mass % or more, and particularly preferably 8 mass % or more, and is preferably 30 mass % or less, more preferably 20 mass % or less, and even more preferably 15 mass % or less. When the ratio of the vinyl cyanide monomer unit in the polymer is 1 mass % or more, the resin of the laminate sheet is prevented from remaining on an adherend, and a sufficient strength is imparted to the obtained foamed sheet at the same time. On the other hand, when the ratio of the vinyl cyanide monomer unit in the polymer is 30 mass % or less, sufficient flexibility of a foamed sheet to be obtained can be ensured and a laminate sheet having good self-adhesive force can be produced.

<<Alkenyl Aromatic Monomer Unit>>>

An alkenyl aromatic monomer unit is a repeating unit derived from an alkenyl aromatic monomer. Specific examples of the alkenyl aromatic monomer include styrene, $\alpha$-methylstyrene, $\alpha$-chlorostyrene, vinyltoluene, and divinylbenzene, for example. Of these, styrene is preferred in view of the polymerizability and the cost.

One kind alkenyl aromatic monomer unit may be used alone, or two or more kinds of alkenyl aromatic monomer units may be used in combination.

The ratio of the alkenyl aromatic monomer unit in the polymer when all repeating units in the polymer (all monomer units) are taken to be 100 mass % is preferably 0.5 mass % or more, more preferably 1 mass % or more, even more preferably 1.5 mass % or more, and particularly preferably 2 mass % or more, and is preferably 20 mass % or less, more preferably 10 mass % or less, and even more preferably 5 mass % or less. When the ratio of the alkenyl aromatic monomer unit in the polymer is 0.5 mass % or more, hydrophobicity of the alkenyl aromatic monomer unit prevents water from entering into a foamed sheet, which increases the water resistance of the laminate sheet. On the other hand, when the ratio of the alkenyl aromatic monomer unit in the polymer is 20 mass % or less, sufficient flexibility of a foamed sheet to be obtained can be ensured and a laminate sheet having good self-adhesive force can be produced.

<<Other Monomer Units>>

Other monomers units are repeating units derived from other monomers copolymerizable with the above-described monomers.

Here, examples of other monomers include conjugated diene monomers, $\alpha,\beta$-ethylenically unsaturated polyvalent carboxylic acid complete ester monomers, carboxylic acid unsaturated alcohol ester monomers, olefinic monomers, and other monomers having a functional group. One kind of the these monomers may be used alone, or two or more kinds of these may be used in combination. Specific examples of such other monomers are not particularly limited, and those described in, for example, WO 2018/151274 A can be used.

It is to be noted that the polymer is preferably free of N-methylol groups from the viewpoint of sufficiently reducing the generation of formaldehyde during foaming and curing of the composition for a foamed sheet. More specifically, the polymer is preferably free of monomer units having an N-methylol group.

Here, monomers having N-methylol groups are exemplified by N-methylolacrylamide and N-methylolmethacrylamide.

<<Properties>>

[Glass Transition Temperature]

The glass transition temperature of the polymer is preferably −10° C. or lower, more preferably −13° C. or lower, even more preferably −17° C. or lower, still even more preferably −20° C. or lower, and particularly preferably −26° C. or lower. When the glass transition temperature of the polymer is −10° C. or lower, sufficient self-adhesive force of the laminate sheet is ensured and a satisfactory adhesion of the laminate sheet to the adherend is achieved, thereby preventing water from entering between the adherend and/or the layer of the laminate sheet. As a result, the water resistance of the laminate sheet can be enhanced.

Further, the lower limit of the glass transition temperature of the polymer is not particularly limited, but is preferably −40° C. or higher in view of sufficiently preventing the resin of the laminate sheet from remaining on an adherend.

Note that the glass transition temperature of the polymer can be measured by the method described in the EXAMPLES section of the present specification.

[Gel Fraction]

The gel fraction of the polymer is preferably 95 mass % or less, more preferably 93 mass % or less, and even more preferably 91 mass % or less. When the gel fraction is 95 mass % or less, a foamed sheet and a laminate sheet having appropriate self-adhesive force and excellent smoothness can be produced. Further, the lower limit of the gel fraction of the polymer is not particularly limited, but may be, for example, 50 mass % or more, may be 70 mass % or more, or may be 80 mass % or more.

The gel fraction of the polymer can be measured by the method described in the EXAMPLES section of the present specification.

<<Method of Preparing Polymer Composition>>

The polymerization method for preparing the resin is not particularly limited. Any of polymerization methods such as solution polymerization, emulsion polymerization, suspension polymerization, bulk polymerization may be used, or any other methods may be used. Types and amounts of a polymerization initiator, an emulsifying agent, a dispersing agent, and the like that are used for polymerization are not limited as well. Methods for adding a monomer, a polymerization initiator, an emulsifying agent, a dispersing agent, and the like upon polymerization are not limited as well. Also, there is no limitation on polymerization temperature, polymerization pressure, stirring conditions, and the like.

Note that the polymer in a solid state can be used. However, the polymer in the form of a latex (polymer latex) including the polymer, such as a latex obtained by emulsion polymerization, or a latex obtained by post-emulsification of the polymer, makes the operations such as mixing with the crosslinking agent and the wax agent easier, and is convenient for foaming the resultant composition for a foamed sheet.

In the case where the polymer in the form of a polymer latex as described above is used for preparing a composition for a foamed sheet, the solid content concentration in the polymer latex is preferably 40 mass % or more, more preferably 45 mass % or more, even more preferably 50 mass % or more, particularly preferably 52 mass % or more, and is preferably 70 mass % or less and more preferably 58 mass % or less, from the viewpoint of keeping the density of the obtained foamed sheet.

<Crosslinking Agent>

The crosslinking agent contained in the composition for a foamed sheet of the present disclosure is not particularly limited as long as it can form a crosslinked structure with the above-described polymer (in particular, with the unsaturated carboxylic acid monomer unit in the above-described polymer). Examples of such a crosslinking agent include carbodiimide-based crosslinking agents; epoxy-based crosslinking agents; oxazoline-based crosslinking agents; polyfunctional isocyanate-based crosslinking agents such as tolylene diisocyanate, trimethylolpropane tolylene diisocyanate, and diphenylmethane triisocyanate; metal salt-based crosslinking agents; metal chelate-based crosslinking agents; and peroxide-based crosslinking agents. Of these, epoxy-based crosslinking agents are preferably used, and compounds having two or more epoxy groups in one molecule are more preferably used. Preferred epoxy-based crosslinking agents are a fatty acid polyglycidyl ether, glycerol polyglycidyl ether, and ethylene glycol diglycidyl ether.

The epoxy-based crosslinking agent may be synthesized by a well-known method, or a commercially available product may be used. An example of commercially available epoxy cross-linking agents is, for example, "Ricabond®" (Ricabond is a registered trademark in Japan, other countries, or both) manufactured by Japan Coating Resin Co., Ltd.

An epoxy-based crosslinking agent forms a crosslinked structure inside a molecule of the polymer or between molecules of the polymer through a reaction between an epoxy group in the epoxy-based crosslinking agent and a functional group or the like in the polymer (such as a carboxylic acid group derived from an unsaturated carboxylic acid monomer unit, for example). When an epoxy-based crosslinking agent is used, a foamed sheet having an appropriate self-adhesive force and an excellent strength can be formed. Thus, when a composition for a foamed sheet containing an epoxy-based crosslinking agent as a crosslinking agent is used, the resin of the laminate sheet is prevented from remaining on an adherend.

In the present disclosure, a crosslinking agent which induces generation of formaldehyde such as melamine-formaldehyde resins, urea-formaldehyde resins, and phenol formaldehyde resins are preferably not used.

Here, the blending amount of the crosslinking agent in the composition for a foamed sheet is preferably 0.5 parts by mass or more, more preferably 1 part by mass or more, even more preferably 3 parts by mass or more, and particularly preferably 5.5 parts by mass or more, and preferably 20 parts by mass or less and more preferably 10 parts by mass or less, per 100 parts by mass of the above-described polymer. When the blending amount of the crosslinking agent is within any of the above ranges, a foamed sheet in which strength and elasticity are appropriately maintained can be obtained. Thus, when the foamed sheet is pressed and the pressure is then released, deformed foamed cells in the foamed sheet can restore their original shapes. In addition, the self-adhesive force of the laminate sheet can be ensured, and the resin of the laminate sheet can be sufficiently prevented from remaining on an adherend.

<Wax Agent>

The wax agent contained in the composition for a foamed sheet of the present disclosure is not particularly limited as long as it contains a fatty acid ester (in particular, an ester of a higher fatty acid and a higher alcohol). The content of the fatty acid ester in the wax agent when the total amount of wax agents is taken to be 100 mass % is preferably greater than 50 mass % and 100 mass % or less (stated differently, the fatty acid ester is the main component), more preferably 70 mass % or more and 100 mass % or less, even more preferably 80 mass % or more and 100 mass % or less, and particularly preferably 90 mass % or more and 100 mass % or less. Note that the wax agent may contain one kind of fatty acid ester, and may contain two or more kinds of fatty acid esters.

Here, the wax agent functions as a light release agent in a foamed sheet formed from the composition for a foamed sheet. When a composition for a foamed sheet in which a wax agent is blended to the above-described polymer is foamed and cured to form a foamed sheet, it is presumed that the light releasability imparts an improved recoverability if continuous foamed cells in the foamed sheet are deformed so that inner surfaces thereof are brought in contact with each other. Thus, an excellent air escapability even after exposure to heat and pressure of a laminate sheet having the foamed sheet is still achieved.

Examples of the wax agent include natural waxes, synthetic waxes, and mixtures thereof, of which natural waxes are preferably used.

Specific examples of the natural waxes are not particularly limited as long as they contain a naturally-occurring fatty acid ester, and examples thereof include natural waxes derived from plants such as rice bran wax (rice wax), sugarcane wax, carnauba wax, candelilla wax, jojoba oil, wood wax, and Moringa pterygosperma seed oil (Moringa Oil); natural waxes derived from animals such as bee's wax (bee wax), sperm whale oil, and wool fat; and natural waxes derived from minerals such as Montan wax, ozokerite, and ceracin. Of these, Moringa pterygosperma seed oil is preferred from the viewpoint of further enhancing the air escapability of the laminate sheet after exposure to heat and pressure. These natural waxes may be purified from natural materials by known methods, or commercially available products may be used. An example of commercially available natural waxes is, for example, "Purified Moringa Oil" available from NITTOBUSSAN Corporation Ltd.

One wax agent may be used alone, or two or more wax agents may be used in combination.

The fatty acid moiety in the fatty acid ester contained in the wax agent has a carbon number of preferably 16 or more and more preferably 18 or more, and is preferably 34 or less and more preferably 30 or less. When the carbon number of the fatty acid moiety in the fatty acid ester is within any of the above ranges, the air escapability of the laminate sheet after exposure to heat and pressure can be further enhanced. Specific examples of the fatty acid with a carbon number of 16 or more and 34 or less include, for example, saturated fatty acids such as stearic acid (carbon number: 18), arachidic acid (carbon number: 20), and behenic acid (carbon number: 22); and unsaturated fatty acids such as oleic acid (carbon number: 18), linoleic acid (carbon number: 18), and linolenic acid (carbon number: 18).

One of these fatty acids may be used alone, or two or more of these may be used in combination.

The alcohol moiety in the fatty acid ester contained in the wax agent has a carbon number of preferably 30 or more and preferably 34 or less. When the carbon number of the alcohol moiety in the fatty acid ester is within the above range, the air escapability of the laminate sheet after exposure to heat and pressure can be further enhanced. Specific examples of the alcohol with a carbon number of 30 or more and 34 or less include, for example, myrysyl alcohol (carbon number: 30), melysyl alcohol (carbon number: 31), lacteryl alcohol (carbon number: 32), cellomelysyl alcohol (carbon number: 33), and tetratriacontanol (carbon number: 34).

One of these alcohols may be used alone, or two or more of these may be used in combination.

The blending amount of the wax agent in the composition for a foamed sheet is preferably 0.5 parts by mass or more, more preferably 1 part by mass or more, even more preferably 1.5 parts by mass or more, particularly preferably 3.6 parts by mass or more, and is preferably 10 parts by mass or less, more preferably 7 parts by mass or less, and even more preferably 5 parts by mass or less, per 100 parts by mass of the above-described polymer. When the blending amount of the wax agent is 0.5 parts by mass or more per 100 parts by mass of the polymer, the air escapability even after exposure to heat and pressure of the laminate sheet can be further enhanced. On the other hand, when the blending amount of the wax agent is 10 parts by mass or less per 100 parts by mass of the polymer, a good self-adhesive force can be imparted to a laminate sheet to be obtained and the air escapability even after exposure to heat and pressure of the laminate sheet can be further enhanced.

In addition, the blending amount of the fatty acid ester having a fatty acid moiety with a carbon number of 16 or more and 34 or less in the composition for a foamed sheet is preferably 0.5 parts by mass or more, more preferably 1 part by mass or more, even more preferably 1.5 parts by mass or more, and is preferably 10 parts by mass or less, more preferably 7 parts by mass or less, and even more preferably 5 parts by mass or less, per 100 parts by mass of the above-described polymer. When the blending amount of the fatty acid ester having a fatty acid moiety with a carbon number of 16 or more and 34 or less is 0.5 parts by mass or more per 100 parts by mass of the polymer, the air escapability even after exposure to heat and pressure of the laminate sheet can be further enhanced. On the other hand, when the blending amount of the fatty acid ester having a fatty acid moiety with a carbon number of 16 or more and 34 or less is 10 parts by mass or less per 100 parts by mass of the polymer, a good self-adhesive force can be imparted to a laminate sheet to be obtained and the air escapability even after exposure to heat and pressure of the laminate sheet can be further increased.

<Solvent>

The solvent which may be optionally contained in the composition for a foamed sheet of the present disclosure is not particularly limited, but water is preferred. When water is used as the solvent, water contained in the composition for a foamed sheet can be, for example, water in the polymer latex.

<Other Additives>

The composition for a foamed sheet of the present disclosure may optionally contain various additives for improving workability in production steps of a foamed sheet and a laminate sheet and improving performances of the foamed sheet and the laminate sheet produced. Examples of such additives include foam stabilizers such as higher fatty acid salts and surfactants, auxiliary blowing agents, thickeners, fillers, antiseptics, fungicides, gelatinizers, flame retardants, anti-aging agents, antioxidants, pigments, dyes, tackifiers, conductive compounds, water-resistant agents, and oil-resistant agents. Specific examples of the other additives described above are not particularly limited, and well-known additives such as those described in WO 2016/147679 A1 can be used.

(Self-adhesive Foamed Laminate Sheet)

A laminate sheet of the present disclosure includes a foamed layer made of a foamed sheet produced from the above-described composition for a foamed sheet of the present disclosure, and a substrate as a support layer supporting the foamed layer. The foamed sheet may be formed directly on the substrate or may be formed above the substrate having a layer interposed therebetween.

<Self-adhesive Foamed Sheet>

The self-adhesive foamed sheet composing the foamed layer in a laminate sheet of the present disclosure is formed through crosslinking and foaming of the composition for a foamed sheet of the present disclosure.

The density of the self-adhesive foamed sheet is not particularly limited, but the self-adhesive foamed sheet has a density of preferably 0.1 g/cm$^3$ or more and 1.0 g/cm$^3$ or less, more preferably 0.3 g/cm$^3$ or more and 0.8 g/cm$^3$ or less, and even more preferably 0.5 g/cm$^3$ or more and 0.7 g/cm$^3$ or less. When the density of the foamed sheet is 0.1 g/cm$^3$ or more, the strength of the foamed sheet is ensured. When the density is 1.0 g/cm$^3$ or less, the resin is sufficiently prevented from remaining on an adherend and the air escapability of the laminate sheet after exposure to heat and pressure is further enhanced at the same time.

Note that the density of the foamed sheet can be measured by the method described in the EXAMPLES section of the present specification.

Further, the foamed sheet has a thickness of preferably 0.03 mm or more, more preferably 0.05 mm or more, even more preferably 0.1 mm or more, and preferably 3 mm or less, more preferably 1 mm or less, even more preferably 0.5 mm or less, and particularly preferably 0.2 mm or less. When the thickness of the foamed sheet is 0.03 mm or more, sufficient mechanical strengths of the foamed sheet and the laminate sheet can be ensured. On the other hand, when the thickness of the foamed sheet is 3 mm or less, the air escapability even after exposure to heat and pressure of the laminate sheet can be further enhanced. Further, a laminate sheet which can be repeatably adhered (having a good rework performance) can also be provided.

<Substrate>

A paper substrate other than synthetic paper substrates, a plastic substrate, a fiber substrate, a metal substrate, or a glass substrate may be used as the substrate in the laminate sheet of the present disclosure.

Note that the thickness of the substrate is not particularly limited, but may be, for example, 10 μm or more and 200 μm or less.

<<Paper Substrate>>

The paper substrate is not particularly limited as long as it is not a synthetic paper substrate, and examples thereof include those made of fine paper, art paper, coated paper, kraft paper, and a paper substrate obtained by laminating a thermoplastic resin such as polyethylene to a paper substrate of any of these.

<<Plastic Substrate>>

Examples of the plastic substrate include sheet-like substrates made of polyester-based resins such as polyethylene terephthalate and polyethylene naphthalate; polystyrene-based resins; polyvinyl chloride-based resins; acrylic resins; polycarbonate-based resins; polyamide-based resins; fluorine-based resins such as polytetrafluoroethylene; and mixtures or laminates of these resins.

<<Fiber Substrate>>

Examples of the fiber substrate include sheet-like substrates made of natural fibers such as those made of cotton or silk; polyamide-based synthetic fibers; polyester-based synthetic fibers; polypropylene-based synthetic fibers; polyvinyl chloride-based synthetic fibers; polyvinyl alcohol-based synthetic fibers; semi-synthetic fibers such as acetate; regenerated artificial fibers such as rayon; and mixtures or laminates of these fibers.

<<Metal Substrate>>

The metal substrate is not particularly limited, and examples thereof includes, for example, sheet-like substrates made of a metal such as iron, copper, aluminum, gold, platinum, silver, and alloys or laminates thereof.

<<Glass Substrate>>

The glass substrate is not particularly limited, and examples thereof include sheet-like substrates made of soda-lime glass, borosilicate glass, alkali-free glass, and quartz glass, for example.

<Method of Producing Self-adhesive Foamed Laminate Sheet>

Hereinafter, an example of a method of producing a laminate sheet of the present disclosure will be described.

FIG. 1 illustrates a flowchart illustrating one example of a method of producing a laminate sheet S10 (hereinafter also simply referred to as "production method S10"). As illustrated in FIG. 1, the production method S10 includes a composition production step S1, a foaming step S2, and a sheet formation step S3 in this order. Hereinafter each step will be described.

<<Composition Production Step S1>>

The composition production step S1 is a step of producing a composition for a self-adhesive foamed sheet.

Specifically, in the composition production step S1, a composition for a foamed sheet can be produced by mixing an optional solvent including a polymer, a crosslinking agent, and a wax agent, which are essential components, with other additives which are optionally used, in an arbitrary method.

For example, when a polymer latex is used for preparing the composition for a foamed sheet, a crosslinking agent, a wax agent, and other additives optionally used may be added to the polymer latex and may be mixed in a well-known method.

In the case where a solvent is not used for preparing the composition for a foamed sheet and a solid polymer is used, the solid polymer, a crosslinking agent, a wax agent, and other additives optionally used may be mixed by a well-known method (e.g., using a well-known roll, Henschel mixer, kneader, or the like).

The viscosity of the composition for a foamed sheet including the solvent (e.g., in the form of an emulsion or a dispersion) is preferably 1,000 mPa·s or more and 10,000 mPa·s or less, more preferably 2,000 mPa·s or more and 10,000 mPa·s or less, and even more preferably 3,500 mPa·s or more and 5,500 mPa·s or less. In production of a foamed sheet, if the material flows while the substrate is being coated with a foam made from the composition for a foamed sheet, control on the thickness would become difficult. Such flowing is prevented when the viscosity of the composition for a foamed sheet is 1,000 mPa·s or more. On the other hand, when the viscosity of the composition for a foamed sheet is 10,000 mPa·s or less, control on the foaming magnification by mechanical foaming upon formation of a foamed sheet is not difficult.

Note that the viscosity of the composition for a foamed sheet can be measured by the method described in the Examples of the present specification.

<<Foaming Step S2>>

The foaming step S2 is a step of causing the composition for a foamed sheet to be foamed to obtain a foam of the composition for a foamed sheet.

Specifically, in the foaming step S2, the composition for a foamed sheet prepared in the above composition production step S1 may be caused to be foamed to thereby obtain an unsolidified (uncrosslinked) foam. Here, in the case where the composition for a foamed sheet is in the form of an emulsion or a dispersion, a foamed emulsion or a foamed dispersion is obtained.

In general, mechanical foaming is employed as a foaming method. The foaming magnification may be properly adjusted, is generally 1.2 times or more and 5 times or less, and is preferably 1.5 times or more and 4 times or less. A method for the mechanical foaming is not limited. The mechanical foaming can be carried out by mixing the emulsion or dispersion of the composition for a foamed sheet with a certain amount of air and stirring the mixture in an Oakes mixer, whipper, or the like in a continuous manner or in batch. The thus-obtained foamed emulsion or foamed dispersion is creamy.

Fine pores are formed during the mechanical foaming, and a foamed sheet having an excellent air escapability can be formed in a sheet formation step S3 to be described later. When the foaming magnification is 1.2 times or more, reduction in the air escapability is prevented. When the foaming magnification is 5 times or less, reduction in the strength of the foamed sheet is prevented.

<<Sheet Formation Step S3>>

The sheet formation step S3 is a step of molding the foam into a sheet and then causing a crosslinking reaction of the foam to take place to thereby produce a foamed sheet.

In the sheet formation step S3, a method of molding the foam produced in the above-described foaming step S2 into a sheet is not particularly limited. An example of suitable methods is, for example, coating a desired substrate with the foam to thereby mold the foam into a sheet. In this manner, by coating the desired substrate with the foam and causing a crosslinking reaction to take place, a laminate sheet provided with the foamed sheet directly on the substrate can be obtained.

Note that the coat of the foam can also be provided on a releasable sheet (such as process paper having releasability) in place of the above-described substrate. By coating the releasable sheet with the foam and causing a crosslinking reaction to take place, a laminate provided with the foamed sheet directly on the releasable sheet can be obtained. The releasable sheet is then peeled off from the foamed sheet of the laminate, to thereby separate the foamed sheet (as an independent film).

In the method of providing a coat of a foam onto a substrate or a releasable sheet (hereinafter, referred to collectively as "substrate etc."), generally known coating apparatuses such as an applicator, a bar coater, a roll coater, a reverse roll coater, a screen coater, a doctor knife coater, and a comma knife coater can be used.

The preferred method for causing crosslinking of the sheet-like foam coated on the substrate etc. is to heat to dry the foam. A method for heating and drying is not limited as long as the foam coated on the substrate etc. can be dried and crosslinked. Well-known drying ovens (e.g., an oven with hot air circulation, a hot air chamber with a hot oil circulator, or a far infrared ray heater chamber) can be used. The drying temperature can be 60° C. or higher and 180° C. or lower, for example. Preferably, drying is not carried out at fixed temperature but multi-stage drying is carried out such that drying is carried out from the inside at lower temperature at the early stage of drying, and through at higher temperature at the later stage of drying.

Note that the properties (e.g., the density, the thickness, or the hardness) of the foamed sheet can be adjusted, for example, by changing the mixing ratio of bubbles, the components of the composition for a foamed sheet, the solid content concentration, the conditions of drying and crosslinking, and the like.

Without limitation, after a separator film may be attached to the self-adhesive surface (i.e., the surface on the foamed sheet side) of the laminate sheet obtained through the above-described steps S1 to S3, the laminate sheet may be wound by a winding machine, cut by a press cutter, a slitter, or the like, and processed into piece of a convenient size, for example.

<Applications of Foamed Laminate Sheet>

Printing can be provided to the surface on the substrate side of the laminate sheet of the present disclosure by, for example, offset printing, seal printing, flexographic printing, silkscreening, gravure printing, or printing by a laser printer, a thermal transfer printer, an ink jet printer, or the like.

The laminate sheet provided with printing on the surface on the substrate side can be advantageously used for outdoor applications such as cards for sales promotions, i.e., so-called point-of-purchase (POP) cards (posters, stickers, displays, etc.), horticultural POP items (insertion labels, etc.), road signs (for indicating sites of funerals or house exhibitions, etc.), and display boards (signs of "DO NOT ENTER", forest road work, etc.), for example.

EXAMPLES

The present disclosure will now be described below based on examples. However, present disclosure is not limited to the examples disclosed herein. In the following description, "%" and "parts" used in expressing quantities are by mass, unless otherwise specified.

Moreover, in the case of a polymer that is produced through polymerization of a plurality of types of monomers, the proportion constituted by a monomer unit in the polymer that is formed through polymerization of a given monomer is normally, unless otherwise specified, the same as the ratio (charging ratio) of the given monomer among all monomers used in polymerization of the polymer. In the examples and comparative examples, the glass transition temperature and the gel fraction of the polymer, the viscosity of a composition for a foamed sheet, the density of a foamed sheet, and the air escapability (the initial value and the value after exposure to heat and pressure), and the amount of formaldehyde dissipation of the laminate sheet were evaluated by the following method.

<Glass Transition Temperature of Polymer>

The glass transition temperature (Tg) of the polymer that was used as the material of a self-adhesive foamed laminate sheet was measured with the following method: 50 µm of a polyethylene terephthalate film in thickness was coated with a polymer latex containing the polymer with a 250-µm applicator, and the coating was dried at normal temperature for 24 hours, to obtain a film formed on the polyethylene terephthalate film. This film formed on the polyethylene terephthalate film (except for the polyethylene terephthalate film) was used as a measurement sample for measuring the glass transition temperature Tg (° C.) in accordance with JIS K 7121, under conditions of measurement temperatures of −50° C. or higher and 160° C. or lower and a heating rate of 10° C./minute using a differential scanning calorimeter (trade name: "DSC 7000X", manufactured by Hitachi High-Tech Science Corporation).

<Gel Fraction of Polymer>

The gel fraction of the polymer used in the laminate sheet was measured by the following method: 50 μm of a polyethylene terephthalate (PET) film in thickness was coated with the polymer with a 250-μm applicator, and the coating was dried at normal temperature for 24 hours, to obtain a resin film. A certain amount (X) (approximately 500 mg) of this film was precisely weighed as a sample, and was immersed in 100 ml of ethyl acetate at normal temperature for 3 days. Thereafter, the insoluble content was filtered through a woven metal of 200 mesh, and air-dried at normal temperature for 15 hours. Then, the resultant was dried at 100° C. for 2 hours, and cooled at normal temperature. The weight of the sample (Y) was then measured. The gel fraction was calculated by substitution of the values of X and Y into the following formula.

$$\text{Gel fraction (\%)} = Y/X \times 100$$

<Viscosity of Composition for Foamed Sheet>

The viscosity of the composition for a foamed sheet was measured at 23° C. using a B-type viscometer (trade name: "VISCOTESTER VT-06", manufactured by RION Co., Ltd.).

<Density of Foamed Sheet>

A laminate sheet was produced, and a test piece in a size of 20 cm×20 cm was cut out from the laminate sheet. The mass V (g) of the cut test piece was accurately weighed, and the mass W (g) of the substrate cut to 20 cm×20 cm was accurately weighed. Thereafter, the thickness of each of the produced laminate sheet and the substrate was measured by a thickness meter, and the thickness of the substrate was subtracted from the thickness of the laminate sheet to determine the thickness of the foamed sheet T (cm). In the measurement, the thicknesses at 6 points were measured, which was averaged to be used as the value of the thickness. The density of the foamed sheet was calculated by substituting the measured values of V, W, and T into the following equation:

$$\text{Density (g/cm}^3) = (V-W)/(T \times 20 \times 20)$$

<Air Escapability>
<<Evaluation Apparatus>>

Figure 2:
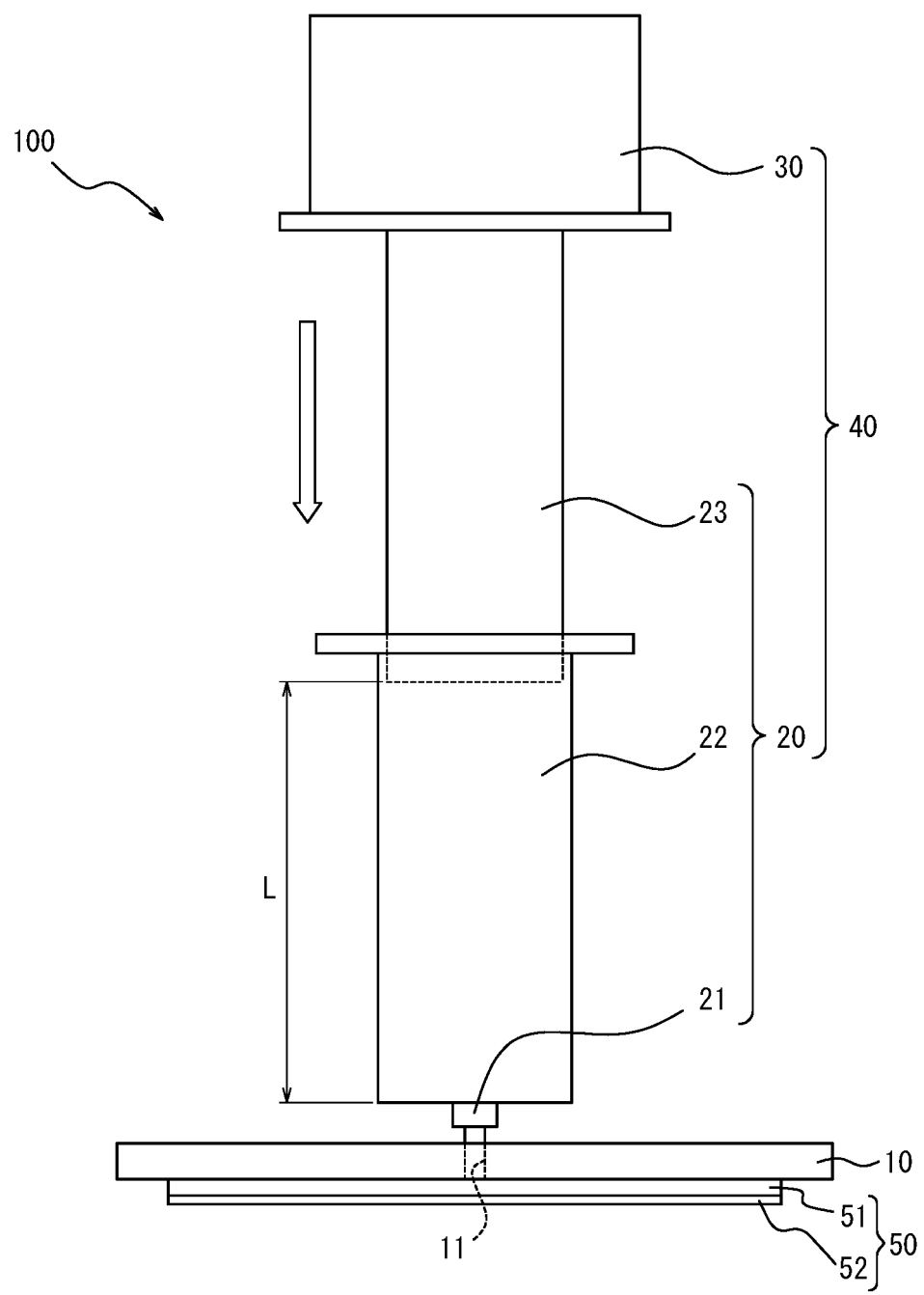
FIG. 2 is a diagram for illustrating a schematic configuration of an evaluation apparatus used for evaluations of the air escapability of self-adhesive foamed laminate sheets in Examples and Comparative Examples.

The evaluation of the air escapability was performed using an evaluation apparatus 100 illustrated in FIG. 2. The evaluation apparatus 100 illustrated in FIG. 2 is an apparatus for evaluating the air escapability of a laminate sheet 50 formed from a laminate of a foamed sheet 51 and a substrate 52, and includes a sample fixing plate 10 having a through hole 11 provided therethorough and a gas pressure-feeding mechanism 40 for pressure-feeding the air as a gas under a constant pressure through the through hole 11 from the other surface side of the sample fixing plate 10 (the upper side in FIG. 2) to the one surface side (the lower side in FIG. 2).

Here, the gas pressure-feeding mechanism 40 has a syringe 20 and a weight 30. The tip end of the syringe 20 is connected to the through hole 11 in the sample fixing plate 10 on the other surface side of the sample fixing plate 10. The syringe 20 is connected to the sample fixing plate 10 with the tip end thereof facing downward in the vertical direction (the lower side in FIG. 2), and includes a needle 21 inserted through and fixed to the through hole 11 in the sample fixing plate 10, a cylindrical outer cylinder 22 of which tip end (the lower side in FIG. 2) is connected to the through hole 11 via the needle 21, and a piston 23 which is to be inserted from the rear end side of the outer cylinder 22 into the outer cylinder 22.

Note that the weight 30 is attached to a flange provided at the rear end of the piston 23 (the upper end in FIG. 2).

Further, in the gas pressure-feeding mechanism 40 having the configuration described above, the piston 23 is driven into the outer cylinder 22 by means of the weights of the piston 23 and the weight 30, so that the air inside the outer cylinder 22 is pressure-fed under a constant pressure through the needle 21 and the through hole 11 to one surface side of the sample fixing plate 10 (foamed sheet 51).

In the evaluation apparatus 100 having the above-described configuration, for example, a laminate sheet 50 is attached to one surface of the sample fixing plate 10 to which the needle 21 has been fixed (on the side opposite to the needle 21 side) so that the through hole 11 is covered (step (A)). The piston 23 having the weight 30 attached thereto is inserted into the outer cylinder 22 to advance to the position where the distance from the end becomes L, and the piston 23 is connected to the needle 21. The time required for the piston 23 to advance the distance L by means of the weights of the piston 23 and the weight 30 is measured (step (B)), to thereby evaluate the air escapability of the laminate sheet 50. Specifically, the air inside the outer cylinder 22 is pushed out through the through hole 11 under a constant pressure by means of the weights of the piston 23 and the weight 30. In this case, when the distance L is set to be constant and the amount of the air pushed out from the outer cylinder 22 is set to be constant, the time to advance the distance L increases as the air escapability of the laminate sheet 50 reduces whereas the time to advance the distance L decreases as the air escapability of the laminate sheet 50 increases. In this manner, the air escapability of the laminate sheet 50 can be quantitatively evaluated using the time required for the piston 23 to advance the distance L. Further, because evaluations are made under constant conditions of the amount and the pressure of the air to be pressure-fed, the air escapability can be evaluated with high repeatability. Further, because the evaluation of the laminate sheet 50 can be made while the laminate sheet 50 is adhered to the sample fixing plate 10, the air escapability of the laminate sheet 50 when being adhered to an adherend can thus be evaluated with a high accuracy.

Note that a transparent polycarbonate plate (50 mm×50 mm) having a thickness of 1 mm was used as the sample fixing plate 10, a glass syringe having a capacity of 2 mL provided with a metal syringe needle having a diameter of 2 mm was used as the syringe 20, and a weight having a weight of 30 g attached to the piston 23 by a double-sided tape was used as the weight 30.

<<Evaluation of Air Escapability (Initial)>>

A laminate sheet was produced and was then cut to a piece with a size of 40 mm×40 mm to be used as a sample for an evaluation.

The foamed sheet side surface of the prepared sample was attached to the surface of the sample fixing plate 10 to which the needle 21 had been fixed (on the side opposite to the needle 21 side) so that the through hole 11 was covered to prevent entry of the air (step (A)). The outer cylinder 22 was inserted into the piston 23 to which the weight 30 had been attached, to the 2-mL position indicated by the scale, and outer cylinder 22 was connected to the needle 21. Thereafter, the hand holding the weight 30 and the piston 23 was released, and the time until the piston 23 and the weight 30 fell completely by means of the weights thereof (i.e., until 2 mL of the air was pressure-fed) was measured (step (B)).

This measurement operation was repeated three times, and the average of time measurements was calculated and was evaluated based on the following criteria. A smaller average indicates better air escapability (initial) of a laminate sheet.
- A: The average of time measurements was 10 seconds or shorter;
- B: The average of time measurements was longer than 10 seconds and 20 seconds or shorter;
- C: The average of time measurements was longer than 20 seconds and 30 seconds or shorter; and
- D: The average of time measurements was longer than 30 seconds.

<<Evaluation of Air Escapability (After Exposure to Heat and Pressure)>>

The laminate sheet was cut out into a piece with a size of 80 mm×120 mm and then the cut piece was pressurized at a pressures of 110 g/cm$^2$ at 60° C. and 80% RH for 24 hours. Thereafter, the laminate sheet was allowed to stand for 24 hours under the conditions of 23° C. and 50% RH, and was then cut out into a piece with a size of 40 mm×40 mm to be used as a sample for an evaluation. Except for these steps, the measurements and evaluation were carried out in the same procedure as in the evaluation of the air escapability (initial). A smaller average indicates better air escapability (after exposure to heat and pressure) of a laminate sheet.

<Evaluation of Amount of Formaldehyde Dissipation>

After a self-adhesive foamed sheet was produced, to which a separator film was then adhered onto the surface of the foamed layer (adhesive layer), the sheet was cut out into a piece with a size of 200 mm×200 mm to prepare a test piece. The test piece was placed into a hermetically sealable tedlar bag of 5 L in volume. Air of 2 L was fed into the sealed bag, and the bag was allowed to stand for 6 hours in a thermostatic chamber at 23° C. at 50% RH. Thereafter, the concentration of formaldehyde in the bag was measured with a detector tube (No. 91L manufactured by Gastec Corporation). The result was rated as follows: the concentration of formaldehyde of 0.1 ppm or below was rated as "A" and the concentration of formaldehyde of higher than 0.1 ppm was rated as "B".

Example 1

<Preparation of Polymer>

To 27.0 parts of deionized water, a monomer mixture consisting of 64 parts of ethyl acrylate, 12 parts of 2-ethylhexyl acrylate, 12 parts of n-butyl acrylate, 9 parts of acrylonitrile, 2 parts of styrene, and 1 part of acrylic acid, together with 0.4 parts of sodium polyoxyethylene alkyl sulfate (trade name: "Rateml E-118B", manufactured by Kao Corporation) were mixed and stirred to obtain a monomer emulsion.

Independently of the above step, a glass reactor vessel equipped with a reflux condenser, a drip funnel, a thermometer, a nitrogen gas blowing port, and a stirrer was prepared and charged with 43.0 parts of deionized water and 0.2 parts of sodium polyoxyethylenealkyl sulfate, and the temperature was increased to 80° C. while stirring. While the temperature was maintained to 80° C., 0.3 parts of ammonium persulfate dissolved in 5.7 parts of deionized water was added. Thereafter, the monomer emulsion obtained as described above was slowly added over 4 hours. After completion of the addition, stirring was continued for another 4 hours. Thereafter, the mixture was cooled to terminate the reaction to thereby obtain a reaction mixture. The polymerization conversion rate at this time was almost 100% (98% or more). The pH of the obtained reaction mixture was adjusted to 5.0 with 5-% ammonia water, and 2.5 parts of polyoxyethylene lauryl ether (trade name: "Emulgen 120", manufactured by Kao Corporation) was added, followed by concentration to obtain a polymer latex having a solid content concentration of 55%. The glass transition temperature and the gel fraction of the polymer contained in the obtained polymer latex were then measured. The results are summarized in Table 1.

<Preparation of Composition for Foamed Sheet>

To a mixing vessel, 100 parts of the above polymer latex (more specifically, 55 parts of the polymer was contained in the polymer latex), 3 parts of an epoxy-based crosslinking agent (trade name: "Ricabond EX-8", manufactured by Japan Coating Resin Co., Ltd.; fatty acid polyglycidyl ether), 2 parts of a wax agent (containing a fatty acid ester having a fatty acid moiety with a carbon number of 16 or more and 34 or less), and 4 parts of an foam stabilizer (ammonium stearate (trade name: "Nopco DC-100A", manufactured by San Nopco Limited)) were added in this order. Finally, a thickener (sodium polyacrylate (trade name: "Alon A-20L", manufactured by Toagosei Co., Ltd.)) was added and the viscosity was adjusted to 4,250 mPa·s to thereby obtain a composition for a foamed sheet.

<Production of Laminate Sheet>

The composition for a foamed sheet produced as described above was stirred with a beater to be whipped so that the foaming magnification was 1.6 times. Then, the stirring speed was reduced and stirring was further continued for 5 minutes.

The composition for a foamed sheet which had been foamed (foam) was applied onto a substrate (a sheet substrate made of polyethylene terephthalate of 50 μm in thickness) using a 0.3-mm applicator. The resultant was placed into a drying oven, and kept at 80° C. for 1.33 minutes; at 120° C. for 1.33 minutes; and at 140° C. for 1.33 minutes, for drying and crosslinking to produce a laminate sheet provided with the foamed sheet on the substrate. The thickness of the foamed sheet after the drying was 0.140 mm. Evaluations were made using the obtained foamed sheet. The results are summarized in Table 1.

Example 2

A composition for a foamed sheet and a laminate sheet were prepared or produced in the same manner as in Example 1, except that a polymer prepared as described below was used. Evaluations were made in the same way as in Example 1. The results are summarized in Table 1.

<Preparation of Polymer>

To 27.0 parts of deionized water, a monomer mixture consisting of 56 parts of ethyl acrylate, 15 parts of 2-ethylhexyl acrylate, 18 parts of n-butyl acrylate, 8 parts of acrylonitrile, 2 parts of styrene, and 1 part of acrylic acid, together with 0.4 parts of sodium polyoxyethylene alkyl sulfate (trade name: "Rateml E-118B", manufactured by Kao Corporation) were mixed and stirred to obtain a monomer emulsion. A polymer latex was obtained in the same manner as in Example 1 except for this point.

Comparative Example 1

<Preparation of Polymer>

To 27.0 parts of deionized water, a monomer mixture consisting of 46.9 parts of ethyl acrylate, 45.8 parts of n-butyl acrylate, 5.9 parts of acrylonitrile, and 1.4 parts of N-methylolacrylamide, together with 0.4 parts of sodium polyoxyethylene alkyl sulfate (trade name: "Lateml E-118B", manufactured by Kao Corporation) were mixed and stirred to obtain a monomer emulsion. A polymer latex was obtained in the same manner as in Example 1 except for this point. Evaluations were made in the same way as in Example 1. The results are summarized in Table 1.

<Preparation of Composition for Foamed Sheet>

The polymer latex obtained as described above was used, and the amount of the crosslinking agent added was changed from 3 parts to 3.6 parts (in other words, 6.5 parts of the crosslinking agent per 100 parts of the polymer). Also, no wax agent was added. A composition for a foamed sheet was prepared in the same manner as in Example 1 except for these point.

<Production of Laminate Sheet>

A laminate sheet was produced in the same manner as in Example 1, except that the composition for a foamed sheet obtained as described above was used. Evaluations were made in the same way as in Example 1. The results are summarized in Table 1.

In Table 1 below:

TABLE 1

| | | | | Example 1 | Example 2 | Comparative Example 1 | Comparative Example 2 |
|---|---|---|---|---|---|---|---|
| Composition for foamed sheet | Polymer | (Meth)acrylate monomer unit (mass %) | EA | 64 | 56 | 46.9 | — |
| | | | MMA | — | — | — | 14 |
| | | | 2EHA | 12 | 15 | — | — |
| | | | BA | 12 | 18 | 45.8 | 70 |
| | | Unsaturated carboxylic acid monomer unit (mass %) | AA | 1 | 1 | — | — |
| | | | IA | — | — | — | 2 |
| | | Vinyl cyanide monomer unit (mass %) | AN | 9 | 8 | 5.9 | — |
| | | Alkenyl aromatic monomer unit (mass %) | ST | 2 | 2 | — | 14 |
| | | Other monomer units (mass %) | NMA | — | — | 1.4 | — |
| | | Tg (° C.) | | −26 | −31 | −26 | −25 |
| | | Gel fraction (mass %) | | 91 | 80 | 43 | 1 |
| | Crosslinking agent | | | 5.5 | 5.5 | 6.5 | 6.5 |
| | Wax agent | | | 3.6 | 3.6 | — | — |
| Laminate sheet | Air escapability (initial) | | | A | A | A | A |
| | Air escapability (after exposure to heat and pressure) | | | A | A | C | D |
| | Amount of formaldehyde dissipation | | | A | A | B | A |

"EA" represents ethyl acrylate unit;
"MMA" represents methyl methacrylate unit;
"2EHA" represents 2-ethylhexyl acrylate unit;
"BA" represents n-butyl acrylate unit;
"AA" represents acrylic acid unit;
"IA" represents itaconic acid unit;
"AN" represents acrylonitrile unit;
"ST" represents styrene unit;
"NMA" represents N-methylolacrylamide unit; and
"Tg" represents glass transition temperature.

<Production of Laminate Sheet>

The foaming magnification was 2 times instead of 1.6 times, and the composition for a foamed sheet obtained as described above was used. A laminate sheet was produced in the same manner as in Example 1 except for these points. Evaluations were made in the same way as in Example 1. The results are summarized in Table 1.

Comparative Example 2

<Preparation of Polymer>

To 27.0 parts of deionized water, a monomer mixture consisting of 70 parts of n-butyl acrylate, 14 parts of methyl methacrylate, 14 parts of styrene, and 2 parts of itaconic acid, together with 0.4 parts of sodium polyoxyethylene alkyl sulfate (trade name: "Lateml E-118B", manufactured by Kao Corporation) were mixed and stirred to obtain a monomer emulsion. A polymer latex was obtained in the same manner as in Example 1 except for this point. Evaluations were made in the same way as in Example 1. The results are summarized in Table 1.

<Preparation of Composition for Foamed Sheet>

The polymer latex obtained as described above was used, and the amount of the crosslinking agent added was changed from 3 parts to 3.6 parts (in other words, 6.5 parts of the crosslinking agent per 100 parts of the polymer). Also, no wax agent was added. A composition for a foamed sheet was prepared in the same manner as in Example 1 except for these points.

<Production of Laminate Sheet>

A laminate sheet was produced in the same manner as in Example 1, except that the composition for a foamed sheet obtained as described above was used. Evaluations were made in the same way as in Example 1. The results are summarized in Table 1.

It can be seen from Table 1 that, in Examples 1 and 2 in which the compositions for a foamed sheet including a polymer, a crosslinking agent, and a wax agent were used, laminate sheets excellent in air escapability even after exposure to heat and pressure were be formed.

In contrast, in Comparative Examples 1 and 2 in which the compositions for a foamed sheet containing no wax agent were used, it can be seen that laminate sheet excellent in air escapability after exposure to heat and pressure could not be formed.

INDUSTRIAL APPLICABILITY

According to the present disclosure, a self-adhesive foamed laminate sheet which is excellent in air escapability even after exposure to heat and pressure, and a composition for a self-adhesive foamed sheet which can be used to produce such a self-adhesive foamed laminate sheet can be provided.

REFERENCE SIGNS LIST

S1 Composition production step
S2 Foaming Step

S3 Sheet formation step
S10 Method of producing laminate sheet
10 Sample fixing plate
11 Through hole
20 Syringe
21 Needle
22 Outer cylinder
23 Piston
30 Weight
40 Gas pressure-feeding mechanism
50 Laminate sheet
51 Foamed sheet
52 Substrate
100 Evaluation apparatus

The invention claimed is:

1. A self-adhesive foamed laminate sheet comprising
a substrate wherein the substrate is a plastic substrate, a fiber substrate, a metal substrate, a glass substrate or a paper substrate other than a synthetic paper substrate; and
a self-adhesive foamed sheet in the form of a single layer that is directly attached to the substrate, the self-adhesive foam sheet being formed from the composition comprising a polymer, a crosslinking agent, and a wax agent, wherein
a gel fraction of the polymer is 80% or more,
the polymer consists of 60 mass % or more and 99 mass % or less of a (meth)acrylate monomer unit, 0.1 mass % or more and 10 mass % or less of an unsaturated carboxylic acid monomer unit, 1 mass % or more and 30 mass % or less of a vinyl cyanide monomer unit, and 0.5 mass % or more and 20 mass % or less of an alkenyl aromatic monomer unit, based on 100 mass % of the polymer, and wherein the polymer is free of N-methylol groups,
the crosslinking agent is at least one selected from the group consisting of a fatty acid polyglycidyl ether, glycerol polyglycidyl ether, and ethylene glycol diglycidyl ether, a blending amount of the crosslinking agent in the composition is 0.5 parts by mass or more and 20 parts by mass or less per 100 parts by mass of the polymer,
the wax agent is at least one selected from the group consisting of sugarcane wax, jojoba oil, wood wax, Moringa pterygosperma seed oil and ozokerite, a blending amount of the wax agent in the composition is 0.5 parts by mass or more and 10 parts by mass or less per 100 parts by mass of the polymer, and
wherein the self-adhesive foamed laminate sheet has an ability to adhere repeatedly to surfaces and to be released repeatedly from the surfaces without leaving a trace thereof on the surfaces.

2. The self-adhesive foamed laminate sheet according to claim 1, wherein the wax agent comprises a fatty acid ester having a fatty acid moiety with a carbon number of 16 or more and 34 or less.

3. The self-adhesive foamed laminate sheet according to claim 2, wherein the fatty acid ester comprises an alcohol moiety with a carbon number of 30 or more and 34 or less.

4. The self-adhesive foamed laminate sheet according to claim 1, wherein the wax agent is Moringa pterygosperma seed oil.

* * * * *